F. I. & B. P. REMY & A. BERGER.
LIQUID GAGE.
APPLICATION FILED NOV. 13, 1914.
1,189,869.
Patented July 4, 1916.
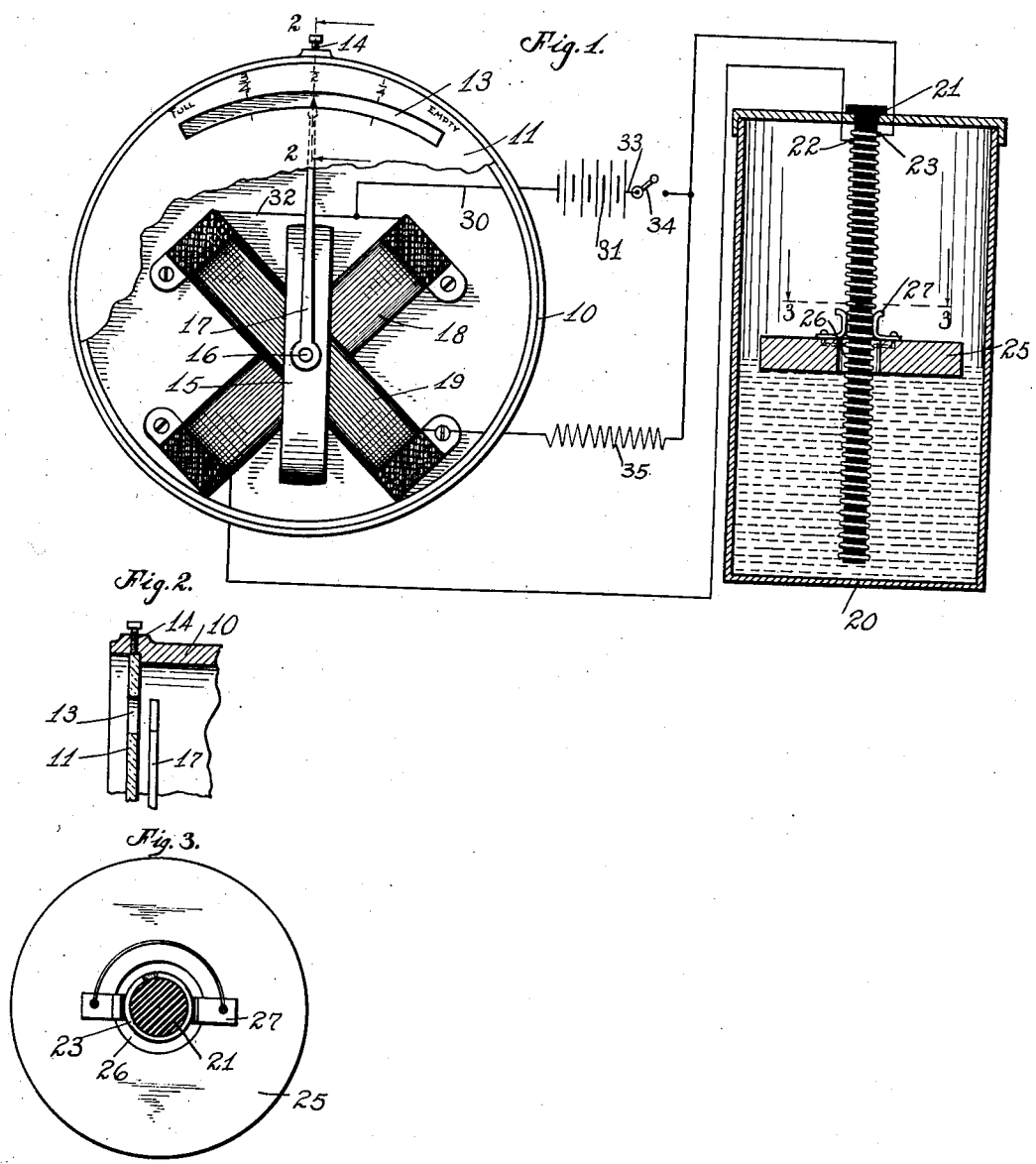
WITNESSES:
INVENTORS
Frank I. Remy
Benjamin P. Remy +
Arthur Berger
BY
ATTORNEY

UNITED STATES PATENT OFFICE.

FRANK I. REMY, BENJAMIN P. REMY, AND ARTHUR BERGER, OF ANDERSON, INDIANA, ASSIGNORS TO REMY BROTHERS COMPANY, OF ANDERSON, INDIANA, A COPARTNERSHIP.

LIQUID-GAGE.

1,189,869.  Specification of Letters Patent.  Patented July 4, 1916.

Application filed November 13, 1914. Serial No. 871,951.

*To all whom it may concern:*

Be it known that we, FRANK I. REMY, BENJAMIN P. REMY, and ARTHUR BERGER, citizens of the United States, and residents of Anderson, county of Madison, and State of Indiana, have invented a certain new and useful Liquid-Gage; and we do hereby declare that the following is a full, clear, and exact description thereof, reference being had to the accompanying drawings, in which like letters refer to like parts.

The object of this invention is to improve the means for indicating the quantity of liquid in a tank so that the gage will be dependable.

The invention has been made for the particular purpose of indicating the amount of gasolene in the tank on a motor vehicle, but it is not necessarily limited to said use.

The chief feature of the invention consists in a gage adapted to be electrically operated and controlled by the quantity of liquid in the tank, acting through a float or other means for varying the current going to the gage in accordance with or in proportion to the quantity of fluid in the tank.

The invention may be carried out in more than one specific manner, as herein set forth.

The full nature of the invention will be understood from the accompanying drawings and the following description and claims.

In the drawings, Figure 1 is an illustration of the invention showing the gage in elevation with a portion of the front plate broken away, the fluid tank in vertical central section, and the electrical connections diagrammatic. Fig. 2 is a section on the line 2—2 of Fig. 1. Fig. 3 is a section on the line 3—3 of Fig. 1.

There is shown in Fig. 1 a gage casing 10 having a removable front plate 11 angularly adjustable in said casing and secured in adjusted position by a set screw 14. In said plate 11 there is a curved slot 13 adjacent which there are graduation marks and numerals indicating the contents of the tank. The angular adjustment referred to is to enable said graduations to be adjusted to suit varying conditions of the remainder of the device and so that said graduations will correctly indicate the contents of the tank.

Within the casing 10 there is a pair of coils 18 and 19 secured to the back wall of the casing and having the same axis. The axes of the two coils are approximately at 90 degree angles to each other. A needle bar 15 is centrally fulcrumed on a rod 16 mounted in the center of said coils so that the similar poles of said two coils will correspondingly influence said needle according to the curve and magnetic influence in each of said coils. A pointer 17 of the needle approaches to and moves along the groove 13 in order to indicate the fluid contents of the tank. The coils 18 and 19 are in a divided circuit so that when current is passed through them there will be a resultant north and south pole line substantially in the direction of the needle valve 15. The direction of this north and south pole line will depend upon the strength of the current passing through each coil and the needle will take a position in line with such north and south pole line.

The fluid tank 20 has mounted in it centrally and vertically a rod 21 of some non-conducting material. This rod extends from the top to or nearly to the bottom of the tank and there are coiled about said rod two wires 22 and 23 in the same direction and parallel with each other from the top to the bottom, but kept electrically out of contact at all points. There is in said tank also a float 25 through the center of which said rod 21 extends and at the central opening 26 thereof there is mounted spring brushes 27 in electrical connection with each other and adapted to yieldingly engage the wires surrounding the rod 21 so as to engage said wires and thus close the circuit between said wires.

The wiring is as follows: A wire 30 extends from a battery 31 and is connected with a wire 32 which is connected with the upper ends of the two coils 18 and 19. In this way the current from the battery is divided to the two coils. A wire 33 runs from the battery to wire 23 and has in it a switch 34. The wire 23 runs to the lower end of the coil 19 and has in it a resistance coil 35. The wire 22 runs to the lower end of the coil 18.

The operation of the device is as follows: If the tank 20 be empty, the float 25 will be at the bottom and the brushes 27 at the lower end of what may be electrically considered as the resistance coil in the tank, that is, the two wires 22 and 23 coiled about the rod 21. When the switch 34 is closed, the circuit is closed and a magnetic influence set up in the coils 18 and 19, which are unbalanced because the resistance 35 out of the tank and the resistance coil in the tank are unbalanced. That is, as here shown, the resistance coil in the tank is greater than the resistance coil 35 out of the tank. Therefore, the magnetic influence of the coil 19 which is connected with the resistance coil 35 will be greater than that of coil 18. Consequently the needle bar 15 will be correspondingly influenced and the pointer 17 moved to the right to its limit and indicate the empty mark on the gage. If, however, the tank 20, say, is one-half full, then the resistance of the resistance coil within the tank is considerably reduced and substantially equals the resistance of coil 35 out of the tank and this causes the magnetic influence of coils 18 and 19 to be equal, thus making the mutual north and south axes so that the pointer 17 will indicate that the tank 20 is half full. If the tank be full and the float is at the top, there will be no resistance in the tank to oppose the resistance of the coil 35. Therefore, the magnetic influence of the coil 18 will greatly exceed that of the coil 19 and the pointer will be moved to its limit at the left and indicate that the tank is full.

The invention claimed is:

1. A device of the kind described including an electrically operated gage, a liquid tank, an electrical circuit for operating said gage, and a float within the tank adapted to directly bridge and close said circuit and vary the resistance according to the quantity of fluid in the tank.

2. A device of the kind described including an electrically operated gage, a liquid tank, an electrical circuit for operating said gage, said circuit having a vertical resistance in the tank adapted to extend into the fluid therein and including a pair of parallel wires electrically disconnected and means actuated by the level of said fluid for varying the resistance.

3. A device of the kind described including an electrically operated gage, said circuit having a vertically disposed resistance coil in the tank consisting of a pair of parallel wires electrically disconnected, and a float in said tank carrying brushes adapted to engage said resistance coil as the float rises and lowers and close the circuit between said wires at variable distances from the end of the coil.

4. A device of the kind described including an electrically operated gage, a liquid tank, a non-conducting rod extending from the top substantially to the bottom of the tank, and an electrical circuit extending from said gage into said tank with the two wires thereof in said tank parallel with each other and wound about said rod from top to bottom and at all points disconnected from each other.

5. A device of the kind described including an electrically operated gage, a liquid tank, a non-conducting rod extending from the top substantially to the bottom of the tank, an electrical circuit extending from said gage into said tank with the two wires thereof in said tank parallel with each other and wound about said rod from top to bottom and at all points disconnected from each other, a float in said tank, and electrically connected spring brushes carried by said float in position to engage said wires.

6. A device of the kind described including an electrically operated gage, a liquid tank, a non-conducting rod extending from the top substantially to the bottom of the tank, an electrical circuit extending from said gage into said tank with the two wires thereof in said tank parallel with each other and wound about said rod from top to bottom and at all points disconnected from each other, a float in said tank surrounding said rod and wires, and electrically connected spring brushes carried by said float in position to engage said wires as the float moves up or down.

7. A device of the kind described including an electrically operated gage, a liquid tank, an electric circuit for operating said gage having in it a resistance coil outside of the tank and a resistance coil inside of the tank, and a float in said tank engaging the resistance coil therein for bridging the circuit and varying the resistance thereof according to the quantity of fluid in the tank.

8. A device of the kind described including an electrically operated gage, a liquid tank, and an electrical circuit for operating said gage and having in it a resistance coil outside of the tank, and a resistance coil inside of the tank adapted to be varied according to the quantity of fluid therein, the resistance coil out of said tank having substantially the same resistance as half of the resistance coil in the tank so that they will substantially equal each other when the tank is about half full of fluid.

In witness whereof, we have hereunto affixed our signatures in the presence of the witnesses herein named.

FRANK I. REMY.
BENJAMIN P. REMY.
ARTHUR BERGER.

Witnesses:
FRANK W. MAKEPEACE,
RUTH I. MILLER.